(12) United States Patent
Brandenburg et al.

(10) Patent No.: US 7,492,050 B2
(45) Date of Patent: Feb. 17, 2009

(54) COOLING SYSTEM FOR A PORTABLE GENERATOR

(75) Inventors: Billy Brandenburg, Horicon, WI (US); Steve Crouch, McFarland, WI (US); John Fiorenza, Slinger, WI (US); Dave Schmitz, Houlton, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 11/873,191

(22) Filed: Oct. 16, 2007

(65) Prior Publication Data

US 2008/0093862 A1 Apr. 24, 2008

Related U.S. Application Data

(60) Provisional application No. 60/853,845, filed on Oct. 24, 2006.

(51) Int. Cl.
*F01P 7/04* (2006.01)
(52) U.S. Cl. ....................................................... 290/1 B
(58) Field of Classification Search .................. 290/1 B
See application file for complete search history.

(56) References Cited

U.S. PATENT DOCUMENTS

| | | | |
|---|---|---|---|
| 2,209,363 A | 7/1940 | Sutherland | |
| 2,355,208 A | 8/1944 | Devol et al. | |
| 3,259,752 A | 7/1966 | Honda | |
| 4,243,893 A | 1/1981 | Sten | |
| 4,495,901 A | 1/1985 | Nannini et al. | |
| 4,548,164 A | 10/1985 | Ylonen et al. | |
| 4,595,841 A | 6/1986 | Yaguchi | |
| 4,608,946 A | 9/1986 | Tanaka et al. | |
| 4,622,923 A * | 11/1986 | Nishimura et al. | 123/2 |
| 4,647,835 A | 3/1987 | Fujikawa et al. | |
| 4,677,940 A | 7/1987 | Bracht et al. | |
| 4,702,201 A | 10/1987 | Odo et al. | |
| 4,779,905 A | 10/1988 | Ito et al. | |
| 4,827,147 A | 5/1989 | Mizushima | |
| 4,835,405 A | 5/1989 | Clancey et al. | |
| 4,856,470 A | 8/1989 | Ishii et al. | |
| 4,859,886 A | 8/1989 | Tanaka et al. | |
| 4,907,546 A | 3/1990 | Ishii et al. | |
| 5,121,715 A | 6/1992 | Nogami et al. | |
| 5,284,115 A | 2/1994 | Imanishi et al. | |
| 5,433,175 A | 7/1995 | Hughes et al. | |
| 5,515,816 A | 5/1996 | Ball et al. | |
| 5,624,589 A | 4/1997 | Latvis et al. | |
| 5,626,105 A | 5/1997 | Locke et al. | |
| 5,694,889 A | 12/1997 | Ball et al. | |

(Continued)

FOREIGN PATENT DOCUMENTS

| | | |
|---|---|---|
| JP | 63056144 | 3/1988 |
| JP | 5312050 | 11/1993 |
| JP | 2007064088 A * | 3/2007 |

*Primary Examiner*—Joseph Waks
(74) *Attorney, Agent, or Firm*—Michael Best Friedrich LLP

(57) ABSTRACT

A method for cooling a generator. The method includes drawing air into a first zone of a housing through a first air intake, drawing air through a controller air intake adjacent a generator controller, directing air from the first zone into a second zone past a separator, drawing air into the second zone from both the first zone and the controller air intake, and exhausting air from the second zone to the exterior of the generator.

19 Claims, 2 Drawing Sheets

U.S. PATENT DOCUMENTS

| | | | |
|---|---|---|---|
| 5,705,917 A * | 1/1998 | Scott et al. ............... 322/46 |
| 5,890,460 A | 4/1999 | Ball et al. |
| 5,899,174 A | 5/1999 | Anderson et al. |
| 5,908,011 A * | 6/1999 | Stauffer et al. ............ 123/2 |
| 5,929,611 A * | 7/1999 | Scott et al. ............... 322/46 |
| 5,965,999 A | 10/1999 | Frank |
| 5,977,644 A | 11/1999 | Smith |
| 5,977,667 A | 11/1999 | Hirose |
| 6,028,369 A | 2/2000 | Hirose et al. |
| 6,039,009 A | 3/2000 | Hirose |
| 6,091,160 A | 7/2000 | Kouchi et al. |
| 6,095,099 A | 8/2000 | Morohoshi et al. |
| 6,100,599 A | 8/2000 | Kouchi et al. |
| 6,134,878 A | 10/2000 | Amako et al. |
| 6,331,740 B1 | 12/2001 | Morohoshi et al. |
| 6,362,533 B1 | 3/2002 | Morohoshi et al. |
| 6,376,944 B1 | 4/2002 | Grizzle, Jr. et al. |
| 6,378,468 B1 | 4/2002 | Kouchi et al. |
| 6,415,759 B2 | 7/2002 | Ohrnberger et al. |
| 6,431,126 B2 | 8/2002 | Saito |
| 6,489,690 B1 | 12/2002 | Hatsugai et al. |
| 6,499,441 B2 | 12/2002 | Suzuki |
| 6,525,430 B1 | 2/2003 | Asai et al. |
| 6,568,355 B2 | 5/2003 | Suzuki |
| D477,569 S * | 7/2003 | Iwatate et al. ............ D13/116 |
| 6,630,756 B2 | 10/2003 | Kern et al. |
| 6,661,107 B2 * | 12/2003 | Higuchi et al. ............ 290/1 A |
| 6,758,169 B2 * | 7/2004 | Suzuki et al. ............. 123/3 |
| 6,784,560 B2 * | 8/2004 | Sugimoto et al. .......... 290/1 R |
| 6,784,574 B2 | 8/2004 | Turner et al. |
| 6,792,897 B2 * | 9/2004 | Higuchi et al. ............ 123/2 |
| 6,917,121 B2 | 7/2005 | Akimoto et al. |
| 6,952,056 B2 | 10/2005 | Brandenburg et al. |
| 6,975,042 B2 | 12/2005 | Yamada et al. |
| 6,979,912 B2 | 12/2005 | Mazuka et al. |
| 6,998,725 B2 | 2/2006 | Brandenburg et al. |
| 7,309,927 B2 * | 12/2007 | Sugiyama et al. .......... 290/1 A |
| 7,430,992 B2 * | 10/2008 | Murakami et al. ......... 123/41.65 |
| 2003/0224833 A1 * | 12/2003 | Egan et al. ............... 455/572 |
| 2006/0214425 A1 * | 9/2006 | Yamamoto et al. ......... 290/1 A |

* cited by examiner

COOLING SYSTEM FOR A PORTABLE GENERATOR

CROSS-REFERENCE TO RELATED APPLICATIONS

This application claims priority to Provisional Patent Application Ser. No. 60/853,845 filed on Oct. 24, 2006 entitled "COOLING SYSTEM FOR A PORTABLE GENERATOR," the entire contents of which is hereby incorporated by reference.

FIELD OF THE INVENTION

The present invention relates to a cooling system for and method of cooling a portable generator.

BACKGROUND

Generators are known for supplying electrical power in remote locations, locations where access to standard utility power is unavailable, and in emergency situations when standard utility power to an area may be temporarily out of service. Generators are available in many different configurations, and use many different types and sizes of engines, depending generally upon the amount of electrical power the generator is designed to provide. Some generators are portable and include a fuel tank for supplying fuel to the internal combustion engine, and a frame for supporting the engine, the alternator, and the fuel tank. Some frames include wheels to facilitate movement of the generator. Other generators are standby units that are permanently mounted near a home, business or other structure.

Generators generally have a frame construction or can be substantially enclosed in a housing. Some of the generator components, such as the alternator and the engine, each generate heat. However, other generator components, such as the controller, need to be kept cool. Enclosing the heat-generating components and the cool components in a single case can create issues for cooling the generator.

SUMMARY

In one embodiment, the invention provides a method for cooling a generator. The method includes drawing air into a first zone of a housing through a first air intake, drawing air through a controller air intake adjacent a generator controller, directing air from the first zone into a second zone past a separator, drawing air into the second zone from both the first zone and the controller air intake, and exhausting air from the second zone to the exterior of the generator.

In another embodiment, the invention provides a cooling system for a generator. The cooling system includes a housing having a first zone and a second zone at least partially divided by a separator. The first zone includes an engine, a first fan rotatable by a crankshaft, a first air intake, and wherein substantially all air from the first zone is directed to the second zone. The second zone includes an alternator, a second fan, a second air intake, and wherein substantially all air from the second zone is directed to the exterior of the generator. The cooling system further includes a controller and an exhaust duct adjacent a muffler.

Other aspects of the invention will become apparent by consideration of the detailed description and accompanying drawings.

Figure 1:
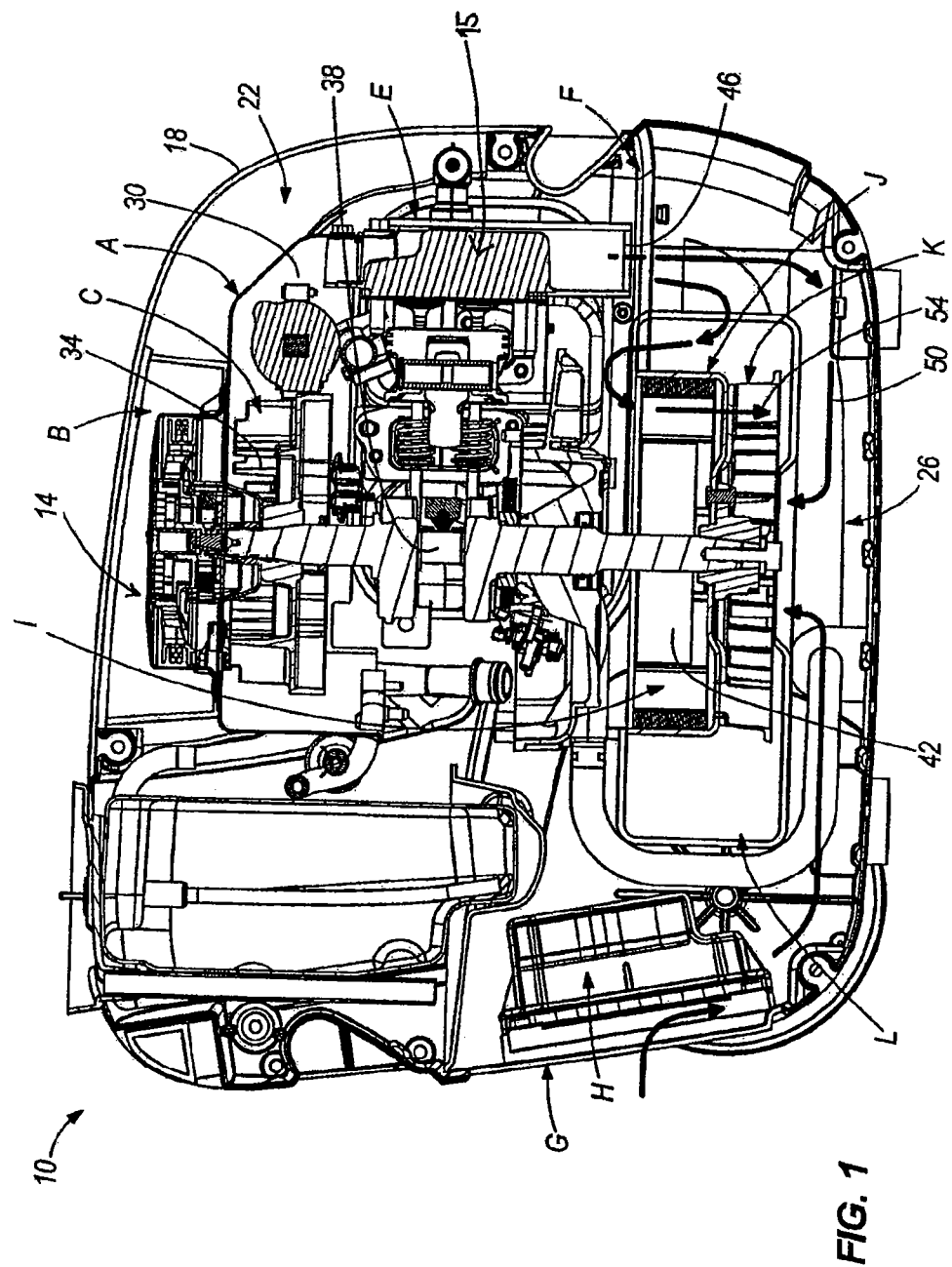
FIG. 1 is an interior view of an embodiment of the present invention.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a generator 10 having a crankshaft engine 14 embodying the present invention. The generator 10 includes a housing 18, a first zone 22 and a second zone 26. The housing 18 encloses the generator components located in the first zone 22 and the second zone 26. The first zone 22 and the second zone 26 are divided by a separator F. Manifolds, or ducts 30, which enable air and exhaust gas movement throughout the internal structure of the generator, are also formed within the housing 18 of the generator 10.

The housing 18 may be substantially of any construction to support the generator components. The housing can be composed of steel, plastic or similar material to enable appropriate generator support.

The first zone 22 includes an engine 14, a blower housing A, a cowl or intake duct B, a flywheel C, a flywheel fan 34, and a head duct E adjacent to an engine cylinder head 15. The engine 14 in the first zone 22 is a heat-producing element which must be cooled to enable efficient generator operation. The cowl or intake duct B provides a passageway for intake air to enter the generator 10. The cowl or intake duct B is positioned substantially in a top wall of the generator 10. The cowl or intake duct B is coupled to the blower housing A, which completes the passageway for intake air to enter the first zone 22. The flywheel fan 34 is preferably integrally formed with the flywheel C. The flywheel fan 34 is rotatable by a crankshaft 38. The engine may have either a vertical crankshaft or a horizontal crankshaft. The rotation of the flywheel fan 34 creates a partial vacuum, or in effect, negative pressure in the first zone 22, which enables air movement throughout the first zone 22 toward the second zone 26. The head duct E provides a passageway for the air from the first zone 22 to enter the second zone 26.

The second zone 26 includes a controller intake G, an electronic controller H and an alternator assembly 42. The alternator 42 in the second zone 26 is a heat-producing element which must be cooled to enable efficient generator operation. The controller intake G is adjacent to the controller H and provides a passageway for intake air to enter the second zone 26. The controller intake G is positioned substantially in a side wall of the generator 10. The controller H is the main electronic control unit of the generator 10 that provides AC output at a specific amplitude, waveform and frequency. The controller H generates heat and will shut down if it becomes overheated. Convective air provides the necessary cooling for the controller H. Additionally, the controller H needs to be kept cool so that it does not pick up heat from the other heat-producing components, namely the engine and the alternator.

The alternator 42 includes a stator I, a rotor J and a rotor fan K. The stator I generates heat, but it does not rotate. The stator I contains the wire windings where current is generated. The stator I efficiency is in part a function of the winding temperature. The rotor J contains magnets that rotate around the stator I, and the rotor J is not significantly affected by temperature. Alternately, the windings could be on the rotor J and the magnets on the stator I.

The rotor fan K is a scroll centrifugal fan coupled to a bottom side of the rotor J. The rotor fan K rotates with the rotor J and the crankshaft 38. The rotation of the rotor fan K and rotor J creates a partial vacuum in the second zone 26 which enables air movement within the second zone 26. A rotor duct L provides a passageway from the second zone 26 to the exterior of the generator 10 for expelling the air from the generator housing 18.

The separator F at least partially divides the first zone 22 and the second zone 26. The separator is preferably a plate that provides a mounting surface for components housed in the first zone 22 and the second zone 26.

Figure 2:
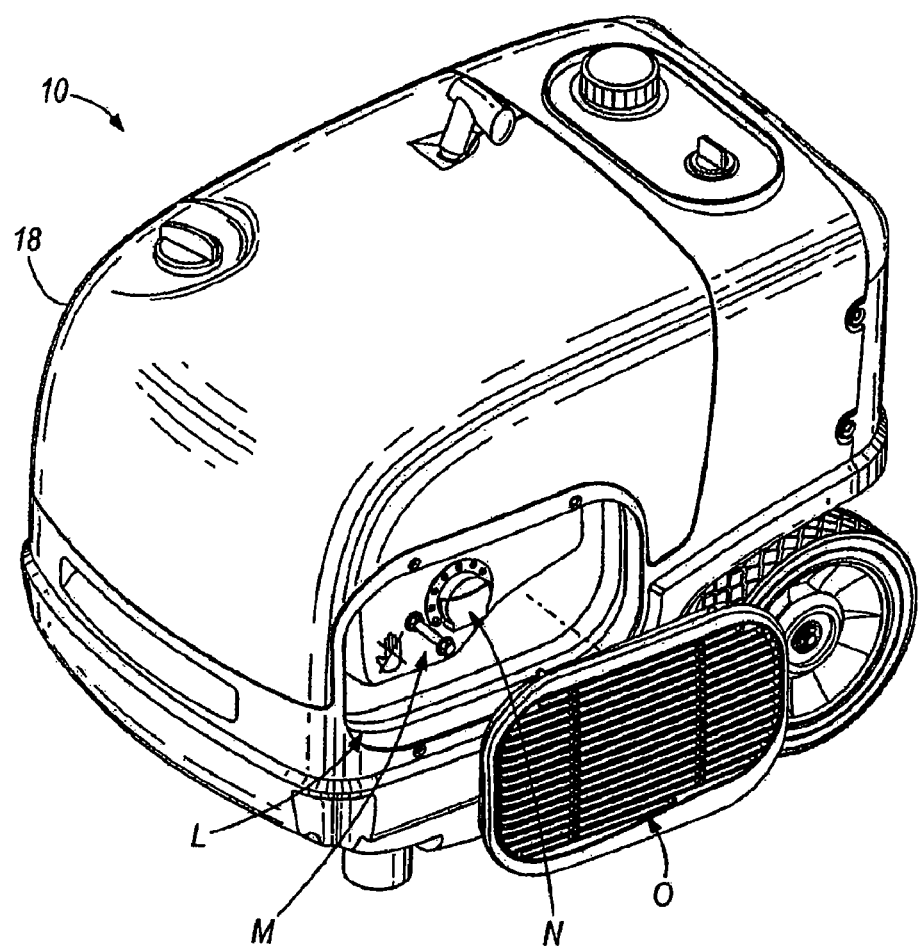
FIG. 2 is a perspective view of a generator according to the present invention.

With reference to FIG. 2, the generator 10 further includes a muffler M, an exhaust deflector N and an exhaust vent O. The muffler M directs the hot engine exhaust gas to the exterior of the generator 10. In the illustrated embodiment, the exhaust deflector N is a ninety degree exhaust deflector. However, the exhaust deflector N can be of any angular configuration capable of directing the hot engine exhaust gases from the muffler M to the rotor duct L. The exhaust deflector N is coupled to the muffler M to direct the hot engine exhaust gas from the muffler M to mix with the cooler air in the rotor duct L. The exhaust vent O is positioned on the exterior of the generator 10 and provides a passageway for the mixture of exhaust gas from the muffler M and the air in the rotor duct L to be expelled to the exterior of the generator 10.

During generator operation and with reference to both FIGS. 1 and 2, air is drawn into the first zone 22 through the cowl or upper intake B. The cowl or intake B is coupled to the blower housing A to complete the passageway for intake air to enter the first zone 22. The rotation of the flywheel C causes the intake air to flow across the engine 14, providing cooling air to the engine 14. The air is then directed to the head duct E which provides a passageway and directs the air from the first zone 22 to the second zone 26 through an aperture 46 in the separator plate F.

The air from the first zone 22 follows two paths 50, 54 in the second zone 26. The first path 50 directs a portion of the air from the first zone 22 to enter the rotor fan K from a bottom side of the rotor fan K. The second path 54 directs a portion of the air from the first zone 22 to flow through a passageway in the rotor J and then through a top side of the rotor fan K. Air is also drawn into the second zone 26 through the controller intake G. The two paths 50, 54 are on a side of the generator 10 opposite the controller H to keep the hot air entering the second zone 26 from the first zone 22 away from the controller H. Intake air from the controller intake G flows across the controller H to cool the controller H. As the air flows past the controller H, the air is farther drawn into the second zone 26 by the partial vacuum created by the rotation of the rotor fan K.

The air in the second zone 26 from the first path 50, the second path 54 and the controller intake G converges at the rotor fan K where the air is expelled from the second zone 26 through the rotor duct L. With reference to FIG. 2, the rotor duct L provides a passageway for the air to move from the second zone 26 to the exterior of the generator 10. The exhaust deflector N directs the hot muffler M engine exhaust gas into the stream of cooler air in the rotor duct L. The hot muffler M exhaust gas mixes with the cool second zone 26 air in the rotor duct L at the exhaust deflector N to further cool the air before it is expelled to the exterior of the generator 10. The mixed exhaust gas is finally expelled from the generator 10 at the exhaust vent O located on the exterior of the generator 10.

Various features and advantages of the invention are set forth in the following claims.

What is claimed is:

1. A cooling system for a generator, the cooling system comprising:
    a housing having a first zone and a second zone at least partially divided by a separator,
        the first zone comprising:
            an engine;
            a first fan rotatable by a crankshaft;
            a first air intake; and
            wherein substantially all air from the first zone is directed to the second zone;
        the second zone comprising:
            an alternator;
            a second fan;
            a second air intake; and
            wherein substantially all air from the second zone is directed to the exterior of the generator;
    a controller; and
    an exhaust duct adjacent a muffler.

2. The cooling system of claim 1, wherein the second fan has a fan shaft that is coaxial with the crankshaft.

3. The cooling system of claim 1, wherein the engine has a vertical crankshaft.

4. The cooling system of claim 1, wherein the first fan is a flywheel fan.

5. The cooling system of claim 1, wherein the first zone is positioned substantially vertically above the second zone.

6. The cooling system of claim 1, wherein the first fan rotates to create a partial vacuum to draw air into the first zone.

7. The cooling system of claim 1, wherein the first air intake is positioned substantially in a top wall of the generator, and wherein the second air intake is positioned substantially in a side wall of the generator.

8. The cooling system of claim 7, wherein the controller is positioned substantially adjacent the second air intake.

9. The cooling system of claim 8, wherein intake air from the second air intake flows substantially adjacent to the controller to cool the controller.

10. The cooling system of claim 1, wherein the generator is an inverter generator.

11. The cooling system of claim 1, wherein the separator is a plate having a fluid flow aperture.

12. The cooling system of claim 1, wherein air from the first zone follows a first path and a second path in the second zone.

13. The cooling system of claim 12, wherein the first path and the second path each include a respective duct formed in the housing of the generator.

14. The cooling system of claim 12, wherein air in the first path enters the second fan from a bottom side of the second fan.

15. The cooling system of claim 12, wherein air in the second path enters the alternator.

16. The cooling system of claim 15, wherein air in the alternator enters the second fan from a top side of the second fan.

17. The cooling system of claim 12, wherein air in the first path, second path, and the second air intake converges near a rotor, wherein converged air is thereafter expelled to the exhaust duct.

18. The cooling system of claim 17, wherein the exhaust duct is substantially positioned such that substantially all of the exhaust gas from the muffler is mixed with air from the second zone.

19. The cooling system of claim 1, further comprising a head duct positioned substantially adjacent a cylinder head of the engine to cool the cylinder head.

* * * * *